May 10, 1938.    J. R. MILLER    2,116,537

FILTER

Filed June 3, 1936

WITNESSES
A.B.Wallace.
V.A.Peckham.

INVENTOR.
James R. Miller
BY Brown, Critchlow & Flick
his ATTORNEYS.

Patented May 10, 1938

2,116,537

UNITED STATES PATENT OFFICE 2,116,537

FILTER

James R. Miller, Pittsburgh, Pa.

Application June 3, 1936, Serial No. 83,305

5 Claims. (Cl. 210—204)

This invention relates to filters, and more particularly to filter elements used especially for filtering liquids such as used lubricating oil.

In general, oil filters comprise a container through which the oil flows, and a removable filter element disposed in the container in the path of the oil. As soon as a filter element becomes fouled with sludge and foreign particles it is removed and discarded, and a new one is substituted. A serious disadvantage of filter elements known heretofore has been that they very quickly pack down into a cake which offers considerable resistance to the flow of oil therethrough. As a result, most of the sludge and foreign particles in the oil are deposited on the filter element's upper surface which is soon fouled thereby to such an extent that flow of oil through the filter is seriously impeded or stopped altogether. Consequently, these filter elements must be renewed at frequent intervals if any benefit is to be derived from them.

It is among the objects of this invention to provide a filter element which has a relatively long life, which is highly efficient, and which is inexpensive and simple in construction. A more specific object is to provide a non-packing filter element of fibrous material.

Figure 1:
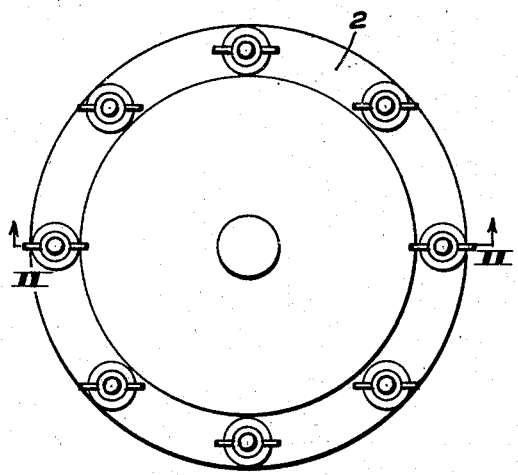
Figure 2:
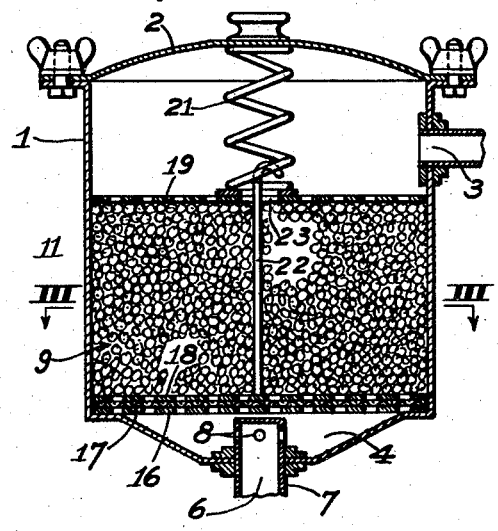
Figure 3:
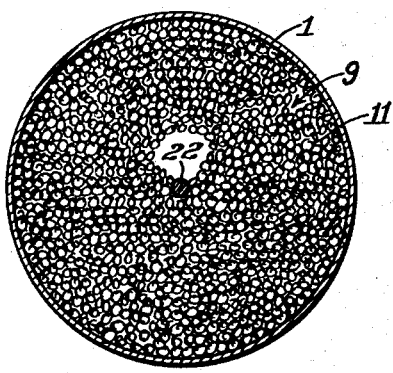
Figure 4:
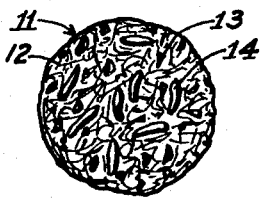

The preferred embodiment of the invention is illustrated in the accompanying drawing in which Fig. 1 is a plan view of a filter casing containing the filter element; Fig. 2 is a vertical section through the filter taken on the line II—II of Fig. 1; Fig. 3 is a horizontal section through the filter element taken on the line III—III of Fig. 2; and Fig. 4 is a greatly enlarged view of one of the pellets from which the filter element is formed.

In accordance with this invention a filter element, which is disposed in a suitable container through which oil or other fluid to be filtered flows, is in the form of a plurality of highly resilient pellets preferably made of fibrous material. Each pellet is a compound ball-like element, although not necessarily perfectly spherical, such as is formed when a tuft of fibres is rolled between the palms of the hands. The fibres in each pellet extend in substantially all directions, and the compression of the pellet distorts them so that they strain to straighten out and thereby make the pellet resilient and highly resistant to caking. These pellets are maintained in a loosely compacted homogeneous mass in the container by the pressure of a spring or the like against one of a pair of perforated members between which the filter element is disposed. Although the use of this filter is not restricted to filtering oil, it shall be described herein as if it were connected in a lubricating oil line of an internal combustion engine.

Referring to the drawing, a filter casing 1 is provided with a removable cover 2 directly below which there is an inlet port 3 through the side wall of the casing. The central portion of the bottom wall of the casing is preferably tapered downwardly to form a sump 4 in the center of which is an outlet port 6. Tightly mounted in the outlet port and projecting into the sump is a nipple 7 which is closed at its upper end and provided in its side walls with openings 8 through which oil in the sump escapes from the casing. Removably disposed in the filter casing between its inlet and outlet ports is a filter element 9 through which the oil to be filtered must pass in flowing through the casing.

It is a feature of this invention that this filter element is highly resistant to packing into a cake, whereby its useful life is materially extended. Accordingly, to obtain the resiliency necessary to prevent packing, the element is in the form of a plurality of permeable pellets 11 engaging one another to form a homogeneous mass, each of the pellets being so formed as to have a high degree of resiliency. Preferably, each individual pellet is in the form of a loosely compacted mass of fibrous material, as shown in Fig. 4 on a magnified scale. Although there is no definite limitation as to the size of the pellets, pellets approximately one-fourth of an inch in diameter have been found especially effective because they are very resilient and therefore do not pack into little cakes.

Various types of fibrous material can be used in making the pellets, but it is preferred to use a material composed of very short fibres so that they will not twist into threads which are undesirable because they are less resilient than a group of separated fibres extending in all directions. A material that is very satisfactory for a filter element of this nature is cotton linters which are fleecy cotton fibres 12 from approximately one-eighth to one-quarter inch long that have been removed from the cotton seeds but not yet carded. These fibres are too short to twist themselves into threads, and therefore they tend to remain in loose resilient bundles in which each fibre is exposed to the oil passing through the filter. A further important characteristic of cotton linters is that, as they have not yet been cleaned, particles 13 of the cotton bolls adhere to them and further prevent the fibres from packing together.

To further maintain the resiliency of the pellets other resilient elements may be mixed with the cotton linters or other fibrous material. Rice hulls 14 (Fig. 4) are especially suitable for this purpose because they are clean, resilient, resistant to absorbing oil, and do not form resins in the presence of oil like straw tends to do.

The pellets may be formed in various ways, such as by blowing the fibres through a plate provided with perforations having diameters substantially equal to the desired diameter of the pellets. Or they can be formed by rolling with a circular movement tufts of fibres on a rough surface. Each pellet need be compacted only enough to cause its constituent fibres to stay together.

As shown in Fig. 2, the filter element is supported in casing 1 by a rigid perforated metal plate 16 seated on the bottom of the casing above the sump. Supported by this plate is a fine mesh strainer screen 17 of copper or the like for filtering out any foreign particles that may pass through the filter element. Disposed on the screen is a rigid foraminous member 18 that supports the filter element on top of which is a second rigid foraminous member 19 that is pressed downwardly, to keep the pellets in engagement with one another in a loosely compacted homogeneous mass, by a coil spring 21 secured to cover 2. To facilitate removal of the filter element from the casing when it requires renewal, an upright rod 22 is secured at its lower end to foraminous member 18 and projects up through an enlarged opening 23 in the upper foraminous member 19. After the cover is removed the upper end of the rod is grasped between the fingers and the filter element, between members 18 and 19, is lifted out of the casing.

A filter element constructed in accordance with this invention has an unusually long and efficient life because it is highly resilient. This causes it to successfully resist packing, and therefore the entire body serves as a filter which thoroughly cleanses the oil and does not unduly interfere with its passage through the filter.

According to the provisions of the patent statutes, I have explained the principle and construction of my invention and have illustrated and described what I now consider to represent its best embodiment. However, I desire to have it understood that, within the scope of the appended claims, the invention may be practiced otherwise than as specifically illustrated and described.

I claim:

1. A filter comprising a homogeneous mass of permeable material in the form of a plurality of pellets individually formed from a mixture of fibrous material and a plurality of resilient elements.

2. An oil filter comprising a homogeneous mass of permeable material in the form of a plurality of pellets individually formed from a mixture of fibrous material and rice hulls, said hulls serving to maintain the pellets resilient.

3. A filter element for use in a casing having an inlet and an outlet, comprising a mass of material in the form of a plurality of pellets individually formed from fibres extending in substantially all directions therein, each pellet being compressed from substantially all directions to distort the fibres therein whereby they strain to straighten out and thereby render the pellet resilient.

4. A filter element for use in a casing having an inlet and an outlet, comprising a loose mass of fibrous material in the form of a plurality of interengaging ball-like pellets individually formed from fibres extending in substantially all directions therein, the fibres in each pellet being compressed toward the center of the pellet from substantially all directions to distort them whereby they strain to straighten out and thereby render the pellet highly resilient.

5. A filter element for use in a casing having an inlet and an outlet, comprising a mass of material in the form of a plurality of pellets individually formed from cotton fibres and particles of cotton bolls adhering thereto, said fibres extending in substantially all directions therein, each pellet being compressed from substantially all directions to distort the fibres therein whereby they strain to straighten out and thereby render the pellet resilient.

JAMES R. MILLER.